United States Patent
Yoon

(10) Patent No.: US 7,357,001 B2
(45) Date of Patent: Apr. 15, 2008

(54) SYSTEM TO PRODUCE DRINKING WATER

(75) Inventor: Hee-Jong Yoon, Siheung (KR)

(73) Assignee: Winix Inc. (KR)

( * ) Notice: Subject to any disclaimer, the term of this patent is extended or adjusted under 35 U.S.C. 154(b) by 341 days.

(21) Appl. No.: 10/541,642

(22) PCT Filed: Jan. 29, 2004

(86) PCT No.: PCT/KR2004/000159

§ 371 (c)(1),
(2), (4) Date: Jul. 6, 2005

(87) PCT Pub. No.: WO2005/030363

PCT Pub. Date: Apr. 7, 2005

(65) Prior Publication Data

US 2006/0112711 A1    Jun. 1, 2006

(30) Foreign Application Priority Data

Sep. 29, 2003   (KR) .................. 10-2003-0067372

(51) Int. Cl.
*F25D 21/14* (2006.01)
(52) U.S. Cl. .......................... 62/285; 62/389
(58) Field of Classification Search ............ 62/93, 62/272, 285, 317, 389, 390; 95/113
See application file for complete search history.

(56) References Cited

U.S. PATENT DOCUMENTS

| 2,761,292 | A | * | 9/1956 | Coanda et al. | ............ 62/260 |
| 3,675,442 | A | * | 7/1972 | Swanson | ............ 62/285 |
| 4,299,599 | A | * | 11/1981 | Takeyama et al. | ............ 96/122 |
| 4,351,651 | A | | 9/1982 | Courneya | ............ 55/210 |
| 5,517,829 | A | | 5/1996 | Michael | ............ 62/272 |
| 5,846,296 | A | | 12/1998 | Krumsvik | ............ 95/115 |
| 6,684,648 | B2 | * | 2/2004 | Faqih | ............ 62/93 |

FOREIGN PATENT DOCUMENTS

KR    10-2004-0038345    5/2004

* cited by examiner

Primary Examiner—Melvin Jones
(74) Attorney, Agent, or Firm—Occhivti Rohlicek & Tsao LLP

(57) ABSTRACT

A system for producing drinking water includes an air-condensing device for generating water by condensing moisture contained in air, the air condensing device being disposed in a first case, a purifying part for filtering off impurities contained in the water generated by the air condensing means, the purifying part being disposed in a second case and connected to the air condensing device through a tube, and a water supply part for supplying the water purified by the purifying part to a user. The air condensing device and the water supply part are disposed in separated sets disposed at a difference place.

6 Claims, 3 Drawing Sheets

SYSTEM TO PRODUCE DRINKING WATER

BACKGROUND OF THE INVENTION (a) Field of the Invention

The present invention relates to a system for producing drinking water, and more particularly, to a system having indoor and outdoor units respectively installed indoor and outdoor spaces, that can produce drinking water by condensing moisture contained in air to collect water, and by purifying and sterilizing the same.

(b) Description of the Related Art

Generally, as water contamination becomes increasingly sever due to the industrialization and environmental pollution, it costs a great deal to purify the contaminated water.

Particularly, it is difficult to drink clear water at a local area where tap water is not supplied. Furthermore, even when the tap water is supplied, there are many limitations in using drinking water in an area where water run short.

In addition, in the case of a ship or a warship, taking a passage over the sea, it leaves with water stored therein or it is equipped with an apparatus for converting seawater into drinking water to obtain the required water.

The apparatus is for converting the seawater into fresh water using an inverse osmosis phenomenon. That is, the seawater is pumped out by a high-pressure pump. The pumped seawater passes through a separation membrane under pressure higher than the osmosis pressure, in the course of which salt contained in the seawater is separated from the water passing through the separation membrane. The apparatus is also used in an area having relatively small rainfall or in an isolated area such as islands where the residents can live by the water supply.

In addition, since a conventional water purifier is designed to be used in a state where it is directly connected to a water pipe, it cannot be used in an area where the tap water is not sufficiently supplied. Therefore, it is difficult to drink the fresh water in such an area.

In the case the ship or warship leaves with the stored drinking water, it costs a lot to buy the drinking water. Furthermore, it is a troublesome to perform a water storing work.

In the case there is a need to make a living in the air (outdoor fields) for a long time, it is very difficult to use fresh water unless the fresh water is delivered thereto.

SUMMARY OF THE INVENTION

Therefore, the present invention has been made in an effort to solve the above-described problem.

It is an objective of the present invention to provide a system that can produce drinking water by condensing moisture contained in air to collect water and purifying and sterilizing the same.

It is another objective of the present invention to provide a drinking water producing system that is designed having separated indoor and outdoor units, thereby providing a convenience in use.

A system for producing drinking water comprising air-condensing means for generating water by condensing moisture contained in air, the air condensing means being disposed in a first case; a purifying part for filtering off impurities contained in the water generated by the air condensing means, the purifying part being disposed in a second case and connected to the air condensing means through a tube; and a water supply part for supplying the water purified by the purifying part to a user, wherein the air condensing means and the water supply part are disposed in separated sets disposed at a difference place.

DETAILED DESCRIPTION OF THE PREFERRED EMBODIMENTS

A preferred embodiment of the present invention will be described more in detail hereinafter in conjunction with the accompanying drawings.

Figure 1:
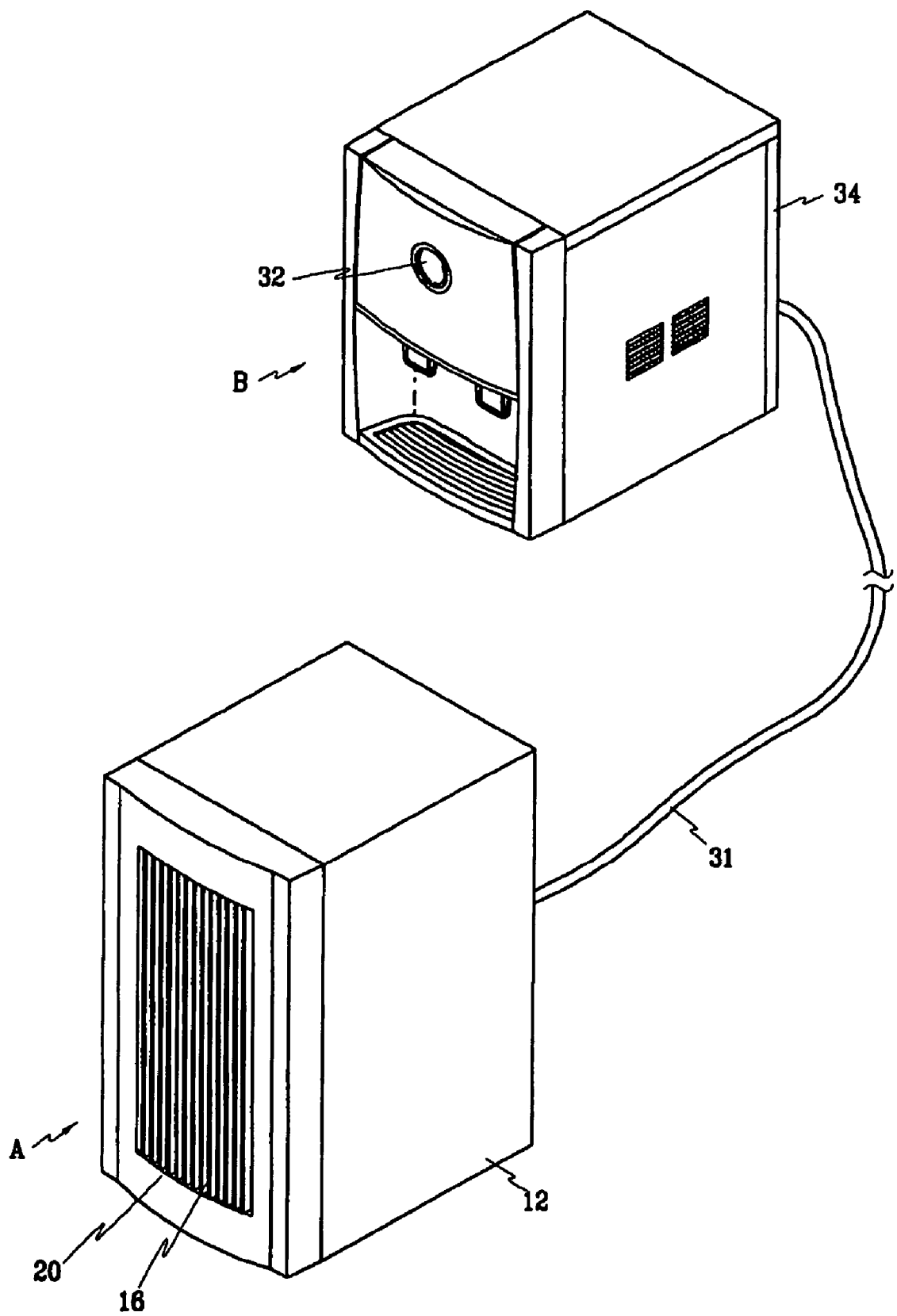
FIG. 1 is a perspective view illustrating an appearance of a drinking water producing system according to a preferred embodiment of the present invention.
Figure 2:
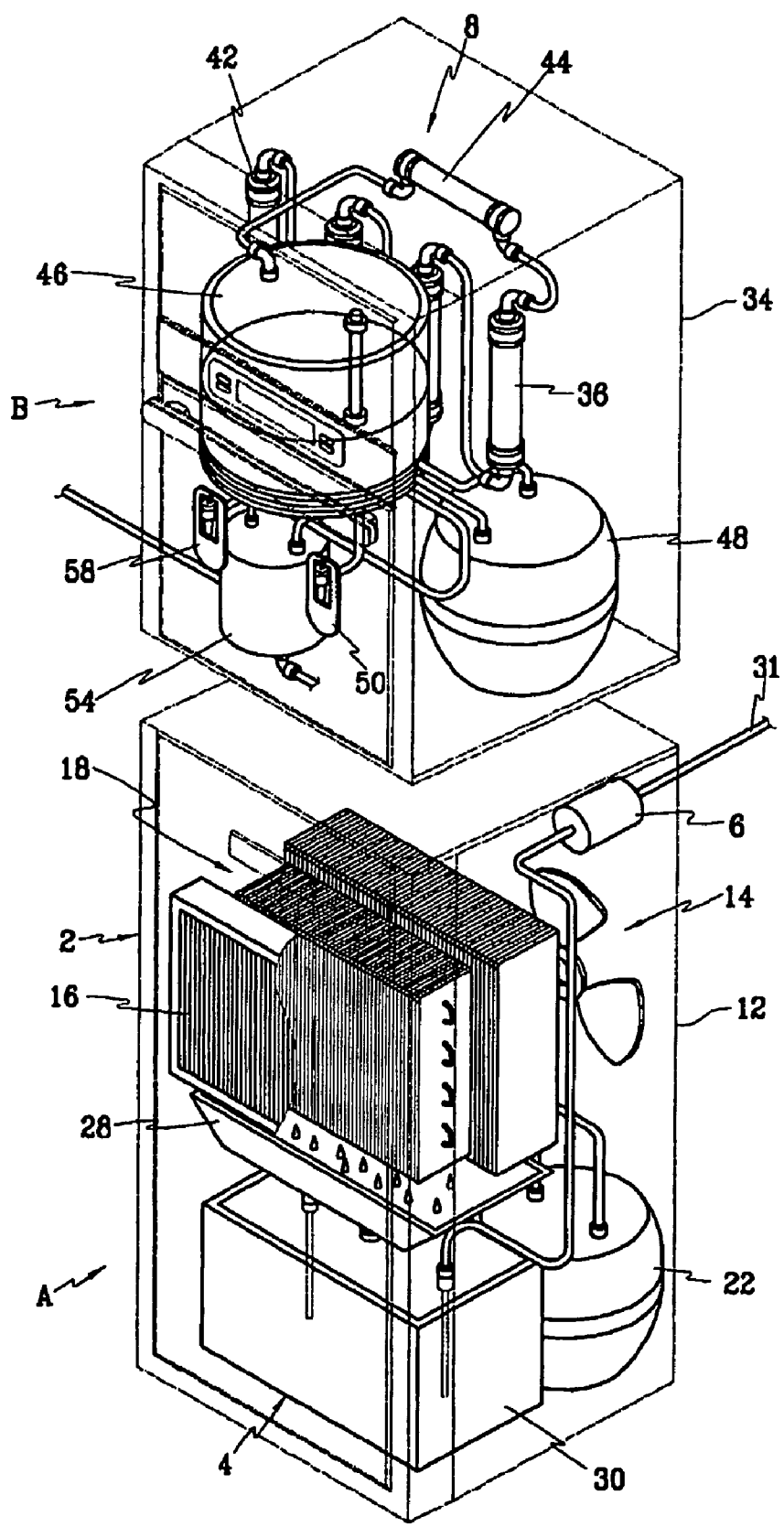
FIG. 2 is a perspective view illustrating an inner structure of a drinking water producing system according to a preferred embodiment of the present invention.
Figure 3:
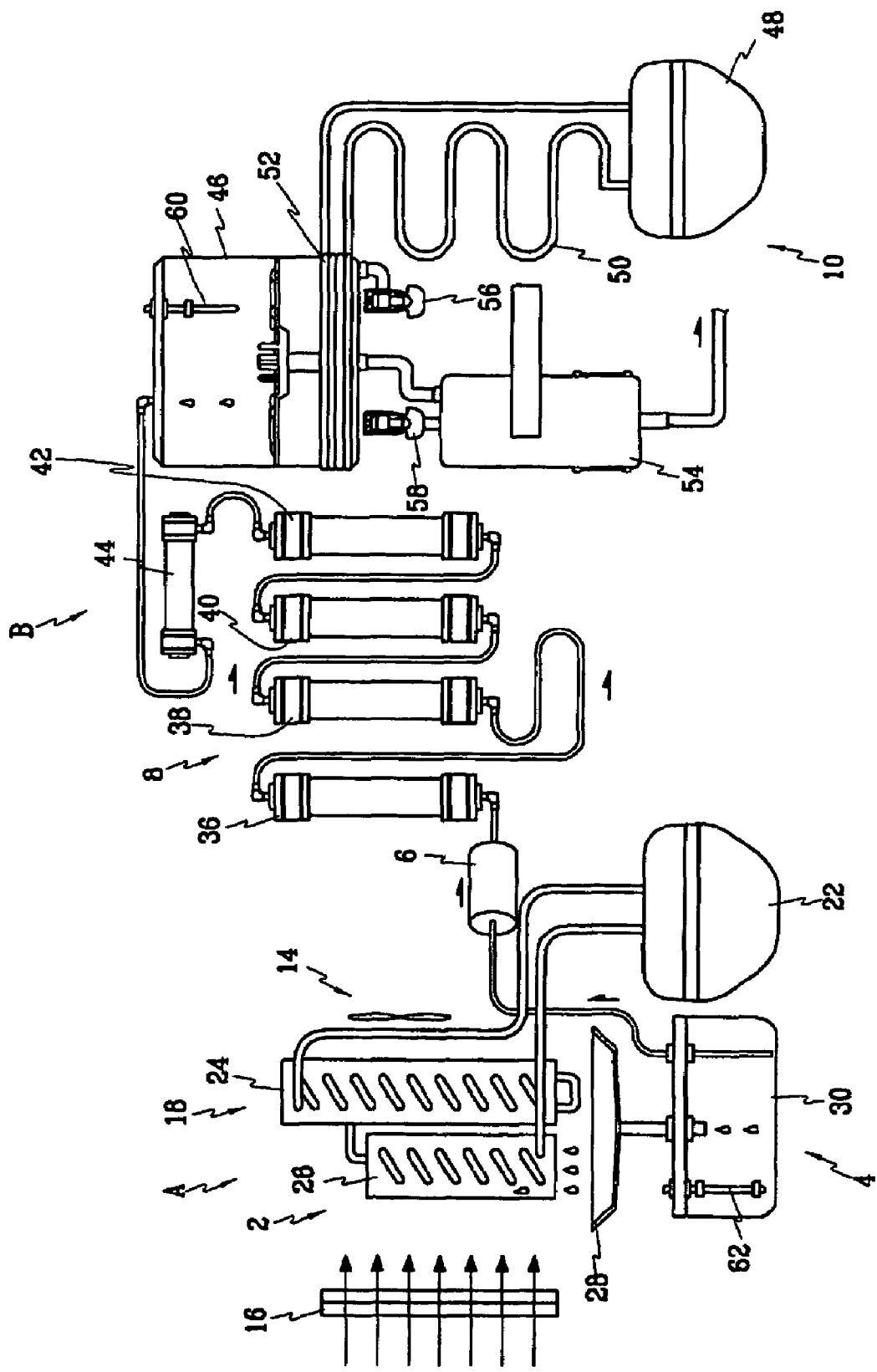
FIG. 3 is a view illustrating a drinking water producing procedure of a drinking water producing system according to a preferred embodiment of the present invention.

FIG. 1 is a perspective view illustrating an appearance of a drinking water producing system according to a preferred embodiment of the present invention, FIG. 2 is a perspective view illustrating an inner structure of a drinking water producing system according to a preferred embodiment of the present invention, and FIG. 3 is a view illustrating a drinking water producing procedure of a drinking water producing system according to a preferred embodiment of the present invention.

As shown in the drawings, the drinking water producing system of the present invention comprises an outdoor unit A and an indoor unit B. The outdoor unit A comprises a water generating part 2, a water storing part 4 for storing the water supplied from the water generating part 2, a pump 6 for pumping the stored water from the water storing part 4. The outdoor part comprises a water purifying part 8 for making drinking water by purifying and sterilizing the pumped water, and a water supply part for allowing a user to use the drinking water produced by the water purifying part 8.

The water generating part 2 comprises a first case 12 for physically protecting inner components from outer impact, air intake means 14 for introducing external air into the first case 12, an air filter for filtering off harmful substances such as particles contained in the air introduced into the first case 12, and air condensing means 18 for making water by condensing the fresh water introduced through the air filter 16.

The first case 12 is provided with an air-introducing hole 20 through which air is introduced, and the air filter 16 is disposed on a rear portion of the air-introducing hole 20. The air intake means 14 is formed of a fan for blowing air while rotating.

The air condensing means 18 is for condensing moisture contained in the air introduced by the air intake means 14, comprising a compressor 22 for vaporizing a refrigerant at a high temperature under a high pressure, a condenser 24 for liquefying the vaporized refrigerant compressed by the compressor 22, an expansion tube (not shown) for lowering pressure of the refrigerant transmitted from the condenser 24, and a vaporizer 26 for vaporizing the refrigerant transmitted from the expansion tub.

The condenser 24 is disposed on a rear surface of the vaporizer 26 so that the air introduced by the intake means 14 can be cooled while passing through the vaporizer 26 and then passes through the condenser 24.

Preferably, the vaporizer 26 is disposed near the rear portion of the air filter 16 and the condenser 24 is disposed near the rear portion of the vaporizer 26.

The air filter 16 is formed of a filter paper provided with minute holes or an antibiotic filter, which is generally for an air conditioner.

Disposed on the vaporizer 26 is a waterspout 28 for collecting moisture generated by the air that is condensed while passing through the vaporizer 26. The waterspout is connected to the water storing part 4 having a water container 30 for storing the condensed water falling into the waterspout 28.

The condensed water stored in the water container 28 of the water storing part 4 is transferred to the purifying part 8 through a tube 31 whose length is properly determined in accordance with an installing place.

The tube 30 can be formed of a flexible hose. A control part 32 for controlling the drive of the pump 6 and the compressor 22 is installed in a second case 34 proximal to the purifying part 8.

The purifying part 8 is also provided in the second case 34 to purify the condensed water supplied through a tube 31. Preferably, the purifying part 8 is comprised of a series of filters consecutively connected to each other.

For example, the purifying part 8 may be comprised of a precipitation filter 35, a preprocessing filter 38, a membrane filter 40, and a postprocessing carbon filter 42. However, the purifying part 8 is not limited to this. That is, any types of filters that can filter out harmful substances such as heavy metals.

The condensed water passing through the filters 35, 38, 40 and 42 is directed to sterilizing means for eliminating harmful microorganisms contained the condensed water. As the sterilizing means, an infrared ray lamp 44 is preferably used.

The purified and sterilized water is directed to a first container 46 of the water supply part 10.

In the first container 46, cooling means is installed to lower the temperature of the water contained in the first container 46. The cooling means can be formed of a conventional cooling system having a compressor 48, a condenser 50 and a vaporizer 52. Alternatively, the cooling means can be defined by winding a tube of the vaporizer 52 around the outer circumference of the first container 46.

The first container 46 is connected to a second container 54 through a tube passage to supply the purified water. Furthermore, a heater system (not shown) can be further provided to increase the temperature of the water contained in the container.

Taps 56 and 58 are installed on the first and second containers 46 and 54 in order for the user to use the water contained in the containers 46 and 54.

When the water is supplied through the tap 56, the water level of the first container 46 is reduced. This is detected by a water level sensor 60 installed in the first container 46 and the detected signal is transmitted to the control part 32. The control part 32 controls the pump 6 to pump out the water contained in the water container 30. The control part 32 can be formed in a conventional design that can control the pump 6 by receiving the signal from the sensors.

That is, the control part 32 is further connected to a water level sensor 62 for detecting the water level of the water container 30 to receive a signal on the water level. Therefore, the control part 32 controls the operation of the compressor 22 to control the production of the water.

In the above-described inventive system, the outdoor unit A is installed at an outdoor place as it is designed to generate noise and heat, while the indoor unit B is installed at an indoor place. At this point, the units A and B are connected to each other through a tube 31 with required electric wire arranged.

In the water generating part 2, a conventional cooling cycle where the refrigerant is compressed and transmitted from the compressor 22 in the first case 12 to the condenser 24, and is then returned to the compressor 22 via the vaporizer 24 is repeatedly processed. At the same time, the air is introduced through the air intake hole 20 of the first case 12 as the air intake means is operated.

At this point, the air introduced through the air intake hole 20 is purified while passing through the air filter 16, and the purified air is introduced into the air condensing means 18.

The purified air is heat-exchanged while passing a space defined between tubes of the vaporizer 26. At this point, since the refrigerant is being vaporized in the tubes of the vaporizer 26, ambient heat is absorbed by the vaporizer, as a result of which the purified air passing through the space defined between the tubes of the vaporizer 26 is condensed.

By this condensing operation, a part of the air passing through the air intake hole 20 is phased-changed into water to fall into the waterspout 28. An amount of water accumulated in the waterspout 28 is increased as the operation is repeated. The accumulated water in the waterspout 28 is directed to the water container 30.

The water stored in the water container 30 is directed to the indoor unit B along a tube 41.

The water directed to the indoor unit B is purified while passing through the filters of the purifying part 8 and the infrared lamp 44 so that the harmful substances such as heavy metals contained in the water can be eliminated and the microorganisms and bacteria can be sterilized.

The purified water is directed to the first container 46 and the second container 54 connected to the first container 46.

The purified water directed to the first container 46 is cooled by the conventional cooling cycle and the purified water directed to the second container 54 is heated by the conventional heating system.

Therefore, the user can use the cool and hot water by pressing the taps 56 and 58. At this point, due to a little use of the water, an amount of the water contained in each of the first and second containers 46 and 54 is increased, the sensor 60 detects it and transmits the corresponding signal to the control part 32 to stop the operation of the pump 6.

In addition, when an amount of water being generated is greater than an amount of water being used, the sensor 62 detects it and transmits the corresponding signal to the control part 32 to stop the operation of the compressor of the water generating part 2. On the contrary, when an amount of water being generated is less than an amount of water being used, the sensor 62 detects it and transmits the corresponding signal to the control part 32 to operate the compressor 22 and the pump 6.

In the above embodiment, although there is only one air condensing means 18, plural air condensing means can be provided to obtain a large amount of water if required.

As described above, since the inventive water producing system is designed to produce drinking water by collecting water in the air and purifying the collected water, it can be conveniently used in the ship or war ship that should store a large amount of water moisture or an area where residents cannot live if there is no water supply.

Furthermore, since the condensing means, the purifying means and the water supplying part are independently provided, the condensing means can be installed at the outdoor place while the purifying means and the water supplying part are installed at the indoor place.

In addition, as the condensing means, the purifying means and the water supply part are separated from each other, the condensing means can be installed at the indoor place, preventing the interior air from being dried while quickly producing a large amount of water. Furthermore, since the volume of the indoor unit can be reduced by as large as a volume of the condensing means, the space of the indoor place can be saved.

What is claimed is:

1. A system for producing drinking water comprising:
   air-condensing means for generating water by condensing moisture contained in air, the air condensing means being disposed in a first case;
   a purifying part for filtering off impurities contained in the water generated by the air condensing means, the purifying part being disposed in a second case and connected to the air condensing means through a tube; and
   a water supply part for supplying the water purified by the purifying part to a user;
   wherein the air condensing means is disposed at an outdoor place and the water supply part is installed in an indoor place.

2. A system for producing drinking water comprising:
   air-condensing means for generating water by condensing moisture contained in air, the air condensing means being disposed in a first case, wherein the air condensing means comprises a compressor for vaporizing a refrigerant at a high temperature under a high pressure, a condenser for liquefying the vaporized refrigerant compressed by the compressor, a vaporizer for vaporizing the refrigerant transmitted from the condenser through an expansion tub, and a fan disposed on a rear side of the condenser to intake the air; a waterspout for collecting the water condensed while passing through the vaporizer is disposed under the vaporizer; and a water container for storing the water supplied from the waterspout;
   a purifying part for filtering off impurities contained in the water generated by the air condensing means, the purifying part being disposed in a second case and connected to the air condensing means through a tube; and
   a water supply part for supplying the water purified by the purifying part to a user;
   in which the air condensing means and the water supply part are disposed in separated sets disposed at a difference place.

3. The system of claim 2 further comprising an air filter disposed in front of the vaporizer to filter off impurities contained in the air.

4. The system of claim 2 further comprising a water level sensor installed in the water container to detect a water level in the water container to control an operation of the air condensing means in accordance with the water level of the water container.

5. A system for producing drinking water comprising:
   air-condensing means for generating water by condensing moisture contained in air, the air condensing means being disposed in a first case;
   a purifying part for filtering off impurities contained in the water generated by the air condensing means, the purifying part being disposed in a second case and connected to the air condensing means through a tube; and
   a water supply part for supplying the water purified by the purifying part to a user, wherein the water supply part comprises a first container for storing the water purified by the purifying part, a second container connected to the first container through a tube, and a cooling/heating device for cooling or heating the water contained in the first and second container;
   in which the air condensing means and the water supply part are disposed in separated sets disposed at a difference place.

6. The system of claim 5 further comprising a water level sensor installed in the first container to uniformly maintain a water level of the first container.

* * * * *